May 10, 1955 — A. B. SOWTER — 2,707,824
METHOD OF MAKING COLD-WELD JOINTS
Filed Nov. 30, 1951 — 3 Sheets-Sheet 1
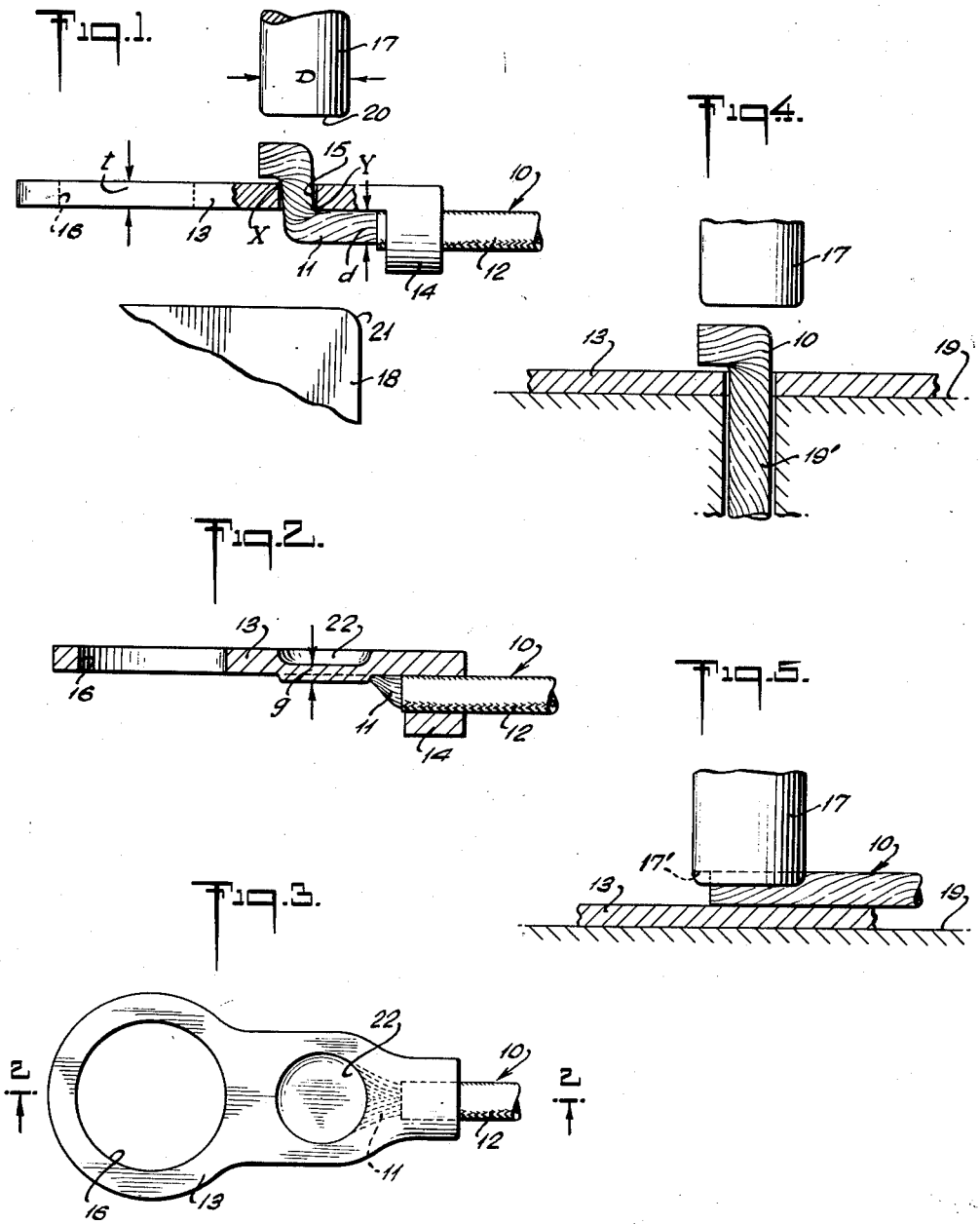
INVENTOR
ANTHONY BAGNOLD SOWTER.
BY
ATTORNEY May 10, 1955  A. B. SOWTER  2,707,824
METHOD OF MAKING COLD-WELD JOINTS
Filed Nov. 30, 1951  3 Sheets-Sheet 2
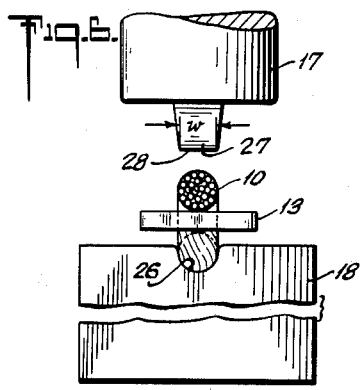
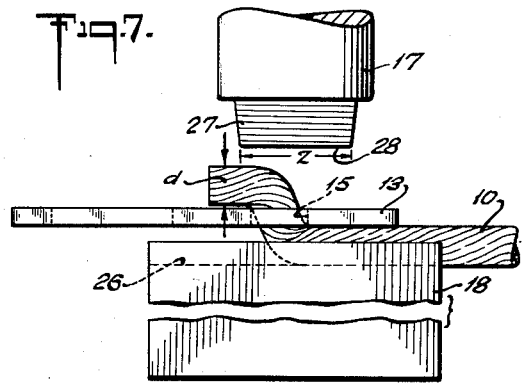
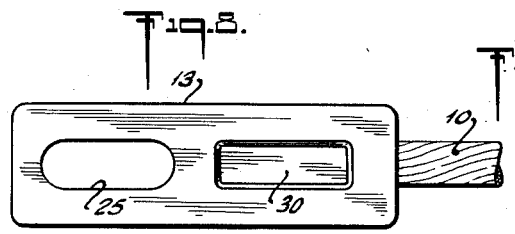
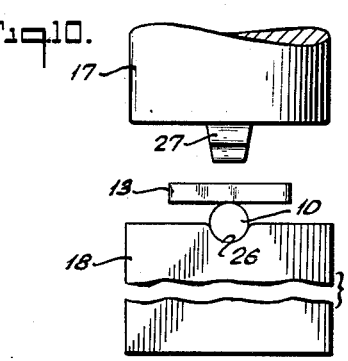
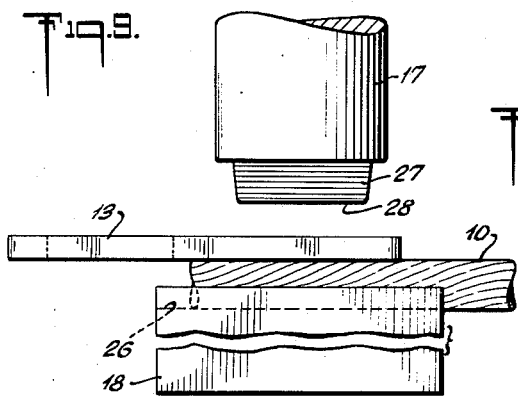
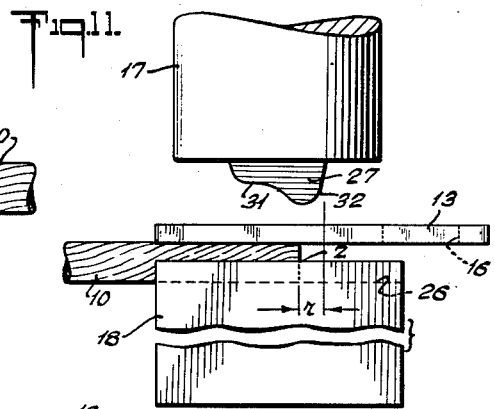
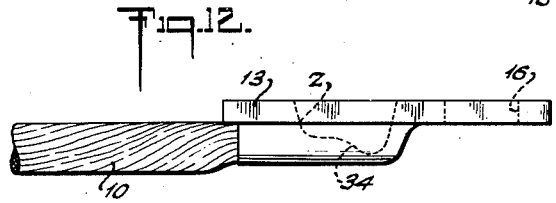
INVENTOR
ANTHONY BAGNOLD SOWTER.
BY
ATTORNEY May 10, 1955 A. B. SOWTER 2,707,824
METHOD OF MAKING COLD-WELD JOINTS
Filed Nov. 30, 1951 3 Sheets-Sheet 3
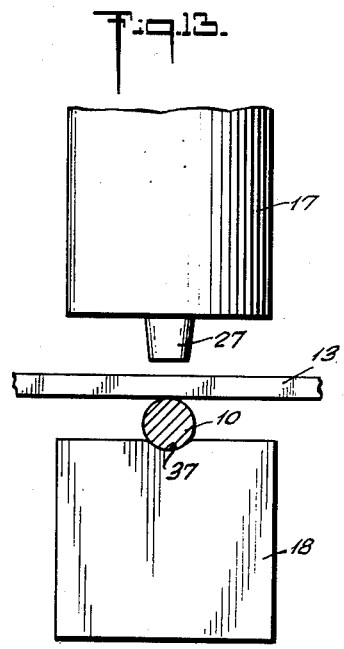
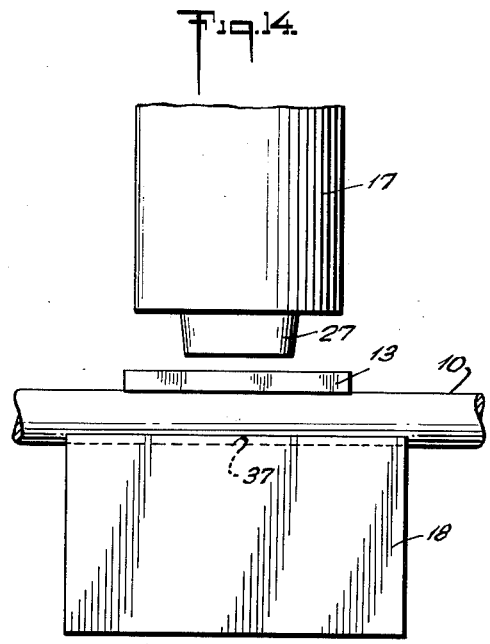
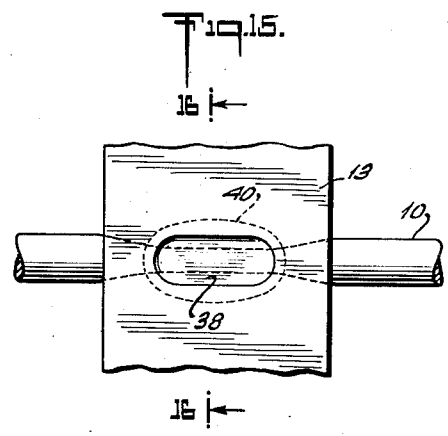
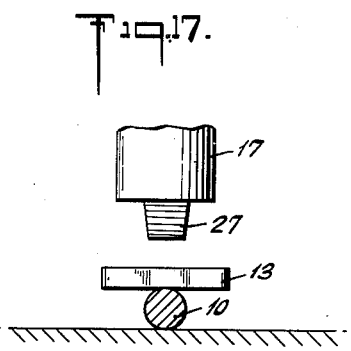
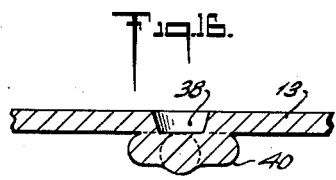
INVENTOR
ANTHONY BAGNOLD SOWTER.
BY
ATTORNEY

United States Patent Office 2,707,824
Patented May 10, 1955

2,707,824

METHOD OF MAKING COLD-WELD JOINTS

Anthony Bagnold Sowter, Wembley, England, assignor to The General Electric Company Limited, London, England Application November 30, 1951, Serial No. 259,059

Claims priority, application Great Britain September 28, 1951

4 Claims. (Cl. 29—470.1)

The present invention relates to pressure welding, such as cold pressure welding, i. e., the joining of members of ductile metal such as aluminum, copper, etc. or metal alloys substantially by pressure applied to the members to be welded.

As is well known in cold pressure welding, as described in my U. S. Patent 2,522,408, dated September 12, 1950, a suitable design of the welding tools for a given type of work pieces or members to be welded and control of the pressure or penetration of the tools into the material being welded, after proper cleaning of the areas of contact to be joined to remove surface oxide and other matter foreign to the metal, will cause a plastic flow of the metals of the adjoining surfaces of said members, so to result in a solid phase welding bond or joint therebetween.

The same applies to pressure welding using some external heat applied to the members to be welded, where welding is, however, essentially effected as a result of the pressure-induced plastic flow of the metal of the adjoining surfaces to be welded, to cause a merging or bonding into an intimate joint or weld. The additional heat may be applied by either heating the pressure welding tools or the members to be welded may be heated before or during welding.

The present invention has for its object the provision of a novel method of and means for joining rods, wires or similar elements to a relatively flat member or fixing device, such as a plate, lug, tab or the like, by pressure welding, both said elements and member consisting of the same or different pressure weldable materials, such as, aluminum, copper, or other ductile metals or metal alloys.

A special, though not limited, application of the invention consists in the joining, both electrically and mechanically, of an electric conductor, such as a wire or cable which may be either of the solid or stranded type, to a termination device, such as a terminal lug or tab commonly used in connection with electric cables or conductors.

In recent years, the use of aluminum in place of copper for electric conductors has increased and it is now standard practice to make stranded conductors or cables with suitable insulation covering using aluminum wires. One difficulty exists, however, when aluminum is used in the attainment of efficient electrical and mechanical connections, especially between a stranded aluminum conductor and a termination device such as a connecting lug or equivalent contact member.

While when copper is used, soldering and brazing techniques may be employed, the same does not apply to aluminum and, furthermore, while pure mechanical clamping may be satisfactory with copper, such clamping is not efficient electrically with aluminum, since even if the wires are cleaned or their oxide coating removed just before clamping, the oxide coating usually builds up with time despite the clamping thus causing the electrical connection to deteriorate because aluminum oxide is a non-conductor. Other difficulties are due to variations of the clamping pressure, which if not carefully controlled during production, may damage the conductors or give rise to other defects, thus increasing the number of unsatisfactory units or rejects.

The above and other difficulties of making efficient joints between wires or other rod-like elements and a plate-like member are substantially overcome by the use of pressure welding, more particularly cold pressure welding, according to the present invention, and a main object of the invention is the provision of a simple and efficient method and means for accomplishing this purpose.

With the foregoing object in view, the novel method according to the invention of attaching a wire element, such as a stranded, braided or the like electric conductor or cable of pressure weldable material, to a lug or equivalent plate-like fixing element also consisting of pressure weldable material, involves generally the trapping or holding of the wire or conductor element and applying to a limited area across the superposed elements, depending upon the size or cross-section of said elements, a pressure to cause a sufficient plastic flow of the materials at the adjoining surfaces of said elements so as to effect welding together of the elements by a solid phase welding bond. The trapping or containment of the rod or wire element has the effect, especially in case of stranded wires or conductors, of preventing the elements from splaying out during welding or being subjected to excessive distortion. Furthermore, the trapping or containment of at least part of the wire, besides serving as a means for locating the same during the pressure application or welding, serves to control or direct the metal flow or displacement in conjunction with the proper design of the pressure tools, so as to result in a favorable flow at the surfaces to be joined and an efficient welding joint, with a minimum of percentage reduction of the material at the weld or distortion suffered by the elements being welded.

In carrying out the invention according to one embodiment, the elements may be trapped or held in position by passing the wire or equivalent element through a hole in the lug or fixing plate, the weld being made at or closely adjacent to the hole and the hole being a fairly close fit around the element.

Alternatively or in addition, the elements may be trapped or held in part by one of the pair of cooperating welding tools which serve to apply pressure to effect welding. Thus, the end of a conductor or cable which is to be pressure welded to the lug or plate may lie in a recess or groove in a tool face, the cross-sectional area of the recess or groove, especially in the case of stranded wires or cables, being about equal to and generally not less than the combined cross-sectional areas of the elements or strands of the wire or cable. This will insure a compacting or welding of the individual wires or strands both to one another and to the lug or other fixing member, as will become more apparent from the following.

As will be understood, the methods and tools described herein may be used for welding both solid or stranded wires to a plate, lug, or equivalent fixing device and it is intended that such use of the methods and tools described shall be included within the scope of the invention. The term wire as used in the following specification and claims is intended to include any rod-like element, such as conductors, cables, etc. and the term plate is intended to include any flat member or fixing device, such as lugs, tabs, strips, or the like.

Before welding, the areas of contact to be joined are advantageously cleaned to remove the oxide film or other surface contamination. This may be done satisfactorily by scratch brushing the surfaces or areas of contact to be joined, to provide exposed areas of pure metal prior to applying welding pressure.

When applying the invention to stranded, braided or the like wires or conductors, it is preferable to remove any surface impurities from all the elements where the weld is to be made and also from the lug or plate. With aluminum and copper conductors, this cleaning can be effected quite simply by mechanical scratch brushing, the elements being unstranded or unbraided for cleaning and twisted or formed up again (without contamination) after cleaning. In some cases, it may only be necessary to clean the outside surfaces of a stranded or braided conductor or element and it is possible that cleaning may be dispensed with altogether in some cases.

The invention will be better understood from the following detailed description considered in conjunction with the accompanying drawings, forming part of this specification and wherein:

Figure 1 shows, in somewhat diagrammatic fashion, a side view of a wire and lug assembly and the welding tools therefor, according to one embodiment of the invention, the elements being shown in their position prior to welding;

Figures 2 and 3 are cross-sectional and plan views, respectively, of the lug and wire shown in Figure 1 after welding;

Figure 4 is similar to Figure 1, showing an alternative arrangement of the wire before welding;

Figure 5 illustrates a modification of a tool assembly and method of pressure welding a wire to a plate, similar to Figure 1.

Figure 6 shows an end view and Figure 7 shows a side view, respectively, of a tool assembly according to an alternative method of joining a wire to a plate in accordance with the invention, the parts being shown in their position prior to welding;

Figure 8 is a plan view of the completed weld obtained by means of the tools according to Figures 6 and 7;

Figure 9 is similar to Figure 7, illustrating still another method for welding a wire to a plate according to the invention, the parts being shown prior to welding;

Figures 10 and 11 are end and side views, respectively, of a somewhat modified tool construction of the type according to Figure 9.

Figure 12 is a cross-section of a cable-lug joint obtained by means of welding tools according to Figures 10 and 11;

Figures 13 and 14 are side and front views, respectively, of still another modified tool assembly for joining wires, preferably of solid cross section, to a plate-like member, the parts to be welded and tools being shown in their position prior to welding;

Figure 15 is a plan view of a weld obtained by means of the tools according to Figures 12 and 13;

Figure 16 is a cross-section taken on line 16—16 of Figure 15; and

Figure 17 is similar to and shows a modification of the tools according to Figure 13, Like reference characters identify like parts throughout the different views of the drawings.

Referring more particularly to Figures 1 to 3 the cable 10, in the example described, consists of eighteen separate conducting strands 11 of aluminum of 0.014" diameter each stranded or twisted together and covered by an insulating covering 12 which is stripped back from the end of the cable where it is to be welded to the lug 13. This lug 13 of aluminum, 0.04" thick is provided, in a known manner, with cable gripping ears 14 and a mounting hole 16 for engaging an electric terminal. Lug 13 furthermore has a hole 15 provided according to the invention through which the end of the cable 10 is passed in the manner shown in the drawing. The diameter of the hole 15 is approximately equal to the diameter of the wire or cable 10, so that the latter passes through the hole easily and snugly.

Before mounting in the hole 15, the strands 11 of the wire 10 are subjected to a cleaning operation, preferably by mechanical scratch-brushing, this operation being such that each wire or strand is cleaned and freed from surface oxide or other impurities. This can be done in any convenient way, such as by suitably untwisting the strands. After cleaning and during assembly and welding, care should be taken to keep the surfaces clean of contamination. In case of solid wires, only the outside surface or the area of contact with the plate 13 has to be cleaned and the same may apply in certain cases to stranded wires. In special cases, cleaning may be dispensed with entirely, where contamination is negligible or where the welding pressure will be sufficient to break or destroy the oxide film.

During assembly, the end of the cable 10 is passed through the hole 15 and bent as shown by using the hole itself so as to engage the opposite faces of the plate or lug 13 adjacent to the hole 15.

The tools for making the weld, in the example shown, consist of an upper tool member or die 17 of circular cross-section and a lower tool member or anvil 18, the upper tool 17 bearing on the back of the lug 13 near the centre line of the hole 15. The upper tool has a flat end face 20 of ³⁄₁₆" diameter and is made from a member of ¼" diameter with a ¹⁄₃₂" corner radius. The axis of the tool lies on or near the axis of the hole 15 and, in the example shown, the free ends of the wire or strands 11 before welding lie just clear of the periphery of the tool 17. The anvil 18 is flat and falls away or is suitably rounded at 21.

To make the weld, the tools 17 and 18 are forced together in a suitable press and upon the superposed cable and lug, whereby to effect a plastic flow of the metal of the adjoining surfaces of the strands and lug and to effect an indentation 22 in the plate or lug 13 by the tool 17. This causes both the individual strands 11 of the cable to merge or be compacted into a solid unit with each other and with the lug 13, in such a manner as to produce a mechanically strong and electrically efficient welding joint or connection, as shown more clearly in Figures 2 and 3 of the drawings.

The final distance between the tools or thickness $g$ of the weld depends both on the materials of the plate and wire as well as on the dimensions thereof. In the case of two flat members or plates each having a thickness $t$, the total percentage reduction in case of aluminum in order to effect a satisfactory weld has been found to range from 50% to 70% of the total thickness $T$ of said members, a 70% reduction insuring the most efficient weld with a minimum of distortion or deformation of the members being welded.

In the present case, upon bringing down the tool 17 upon the anvil 18, the end of the wire 10 underneath the tool 17 is at first flattened during the initial application of the welding pressure, the required percentage reduction in this case being determined by the total of the equivalent thickness of the wire underlying the tool face 20 flattened to a disc having a diameter equal to the tool diameter D and the gauge thickness $t$ of the plate or lug 13. In the example described, assuming a 70% reduction for aluminum, this results in a gap $g$ or thickness of the weld of about .020" corresponding to the value used in the practical example referred to. This value may be increased as far as 50% of the equivalent total thickness and, under some circumstances, may be decreased below 70% of the total thickness if the strength of the weld is of minor importance, as will be described in greater detail hereafter.

In general, welds of the type obtained according to Figures 1 to 3 are especially suitable where the gauge thickness $t$ of the plate 13 is of the order of or comparable to the diameter $d$ of the wire 10 or generally, where the diameter of the wire is about one to three times the gauge thickness of the plate to which it is to be joined. Under the conditions described, good welds are obtainable with a diameter D of the tool 17 being in excess of, such as about three to five times the gauge thickness $t$ and with the final gap $g$ or distance between the tools being less than the thickness $t$ of the plate or lug 13. By applying the welding tool to or effecting the indention on the side of the lug or plate opposite to the wire or cable and by passing the end of the cable through or trapping it in the hole 15, a favorable metal flow is obtained whereby to cause a compacting or welding together of both the individual strands 11 into a solid unit, as well as a welding of the strands with the lug or plate, with a minimum of pressure required and resulting in a minimum of deformation or mechanical distortion of the parts being welded.

In general, the making of satisfactory lap welds between two superposed plates by means of a round pressure tool has been found impracticable without the use of additional external heat. This is due to the uniform radial pressure in all directions, impeding or making difficult a ready escape of the displaced metal. For this reason, a rectangular-shaped weld has been found necessary in making practical cold-weld lap joints, as described in detail in my above mentioned U. S. patent. In the present case, the round tool 17 has a diameter D exceeding the wire diameter $d$, thus anbling or causing an initial metal flow by reason of the round shape or cross section of the wire, compared with a flat plate of uniform thickness in case of normal lap weld joint.

The shape of or radius at the edge 21 of the anvil 18 serves to prevent weakening of the strands at the anvil edge, while the hole 15, besides trapping or holding the strands during welding, has a mechanical anchoring effect on the strands. The strands are compacted in the hole 15 and welds are effected between the strands 11 and the lug 13 predominantly around the two places X and Y. Figure 4 shows a modification of a welding assembly according to Figure 1, using a flat lower anvil 19 provided with a circular recess 19' to accommodate the straight portion of the wire 10 during welding, the remaining elements and the operation during welding being substantially similar to those of Figure 1. After welding the end of the wire to the lug or plate, the adjoining portion of the wire may be bent against the underside of the plate and secured thereto by gripping ears or in any other suitable manner, as will be readily understood.

Figure 5 shows a further modification using a round welding tool pressed against the end of the wire 10 to be welded, the wire being laid upon the lug 13 without being passed through or anchored in a hole in the lug. In this case, in order to hold or trap a portion of the wire, the latter is placed in a groove 17' in the underface of the tool 17, the cooperating tool 19 being a flat anvil similar as shown in Figure 4. Upon pressing the tool 17 against the plate 13 to a position resulting in a final gap as outlined in connection with Figures 1 to 3, the individual strands will be compacted into a solid unit, the upper portion of the wire or strands assuming the shape of the groove 17' and the lower portion being welded to the lug 13. For this purpose, the cross-section of the groove, especially in case of stranded wires, is advantageously about equal to or not less than the cross-section of the wire 10 or the total of the cross-sections of the strands 11. The end of the wire 10 may extend beyond the perimeter of the tool 17 or it may end short of said perimeter as shown. In the latter case, the edges of the individual strands will be butt welded to the lug 13, resulting in a more efficient electrical joint or connection, as explained in greater detail hereafter.

Referring to the embodiment according to Figures 6 to 8, the assembly of the wire 10 and plate 13 is identical with the assembly in Figure 1, but in this embodiment, the lower tool or anvil 18 is provided with a groove 26 for additionally locating or trapping the wire, while the upper tool 17 is provided with an oblong rectangular welding tip 27 having a flat welding surface 28 substantially parallel to the groove 26. A slot 25 for connecting purposes is provided in the lug 13.

As before, the strands of the wire 10 and the lug 13 around the hole 15 are cleaned before welding, such as by means of a rotary scratch brush, and then the assembly is placed in the groove 26 in the anvil 18. The top tool 17 and welding tip 27 cooperate with the anvil 18, the tip 27 lying directly above the groove 26 and having a flat rectangular welding face 28. The groove 26 is semi-circular and the area of its cross section, especially in the case of stranded wires is about equal to, although it can be slightly greater than the sum of the cross sectional areas of the strands 11.

Before welding, part of the wire strands are proud of or extend above the groove 26, but with welding the strands are compacted in the groove 26 by the welding tool 17, the groove 26 serving both to control or direct the metal flow and to trap or hold the strands to prevent them from splaying out during welding. The width $w$ of the top tool face 28, in general, should be of the order or slightly less than the mouth diameter of the groove 26, i. e., of the order of the wire diameter $d$. The length $l$ of the face 28 should be in excess of the diameter $d$ or the width $w$, practically at least twice said width or more.

To effect welding, the top tool 17 is brought down in a press to a distance determined by the height of the tip 27 and due to the plastic flow of the wire 10 and lug 13, the wire and lug are cold-welded together. The finished weld has the appearance shown in Figure 8 on its upper face, with the rectangular depression or indentation 30 caused by the tip 27 of the tool 17 and with the lower face beneath the lug taking the shape of the groove 26. The edges of the tool face 28 are slightly radiused to prevent the tool breaking right through the metal to the wall of the groove 26.

The final thickness $g$ across the weld, that is the gap between the face 28 and the bottom of the groove 26 in this case, is determined by the total T of the wire diameter $d$ and gauge thickness $t$. In the example, assuming the same numerical values given hereinabove, a thickness $g$ of about .040" corresponding to a total percentage reduction of about 70% was found to give satisfactory results. As pointed out, this value may be varied within limits depending on the existing requirements and circumstances. The final thickness $g$ is determined by the height of the tip 27 but may be controlled in any other suitable manner, such as a stop or abutment on the press operating the welding tools. The sides of the tip 27 are preferably chamfered to facilitate easy removal after welding.

According to a further modification of the invention, the hole in the lug plate may be omitted and Figure 9 shows a modified assembly of this type for welding a wire to a plate or other fixing device.

Referring now to Figure 9, the wire 10 is laid in the groove 26 with the lug or plate 13 on top of the wire. In this case, only the undersurface of the lug 13 has to be cleaned and the wire or strands of the wire are cleaned as before. To effect welding, the tool 17 is brought down as in the case of Figures 6 and 7 until the shoulder of the tool limits further penetration of the tip 27. Other details of design and operation are substantially similar to those described in connection with Figures 6 and 7.

In the assemblies described with reference to Figures 6 to 8 and Figure 9, the face 28 is flat and parallel to the bottom of the groove 26 so as to give a substantially constant percentage reduction, usually 60% to 70% in the case of aluminum, along the full length of the tool face or pressure area. However, in special cases it may be advantageous to vary the percentage reduction produced over the face of the tool, in such a manner as to provide adequate strength at certain points and more adequate welding at other points. A tool shape of this type is shown in Figures 10 and 11.

Referring to the latter, the wire 10 again lies in the groove 26 and the tool tip 27, instead of being flat in the direction parallel to the length of the groove 26, has a flat part 31 on the side away from the end z of the wire 10 of lower height and a curved part 32 of relatively greater height opposite to the end of the wire. The maximum projecting height of the curved part may be the same or higher than the tip 27 of Figure 9 and the part 31 lies slightly backwards of the part 32, the two merging one into the other. In the example shown, wire is placed in the groove 26, so that it lies short of the right hand end of the tool tip 27. This besides avoiding any necessity for trimming after welding will result in a combined lap as well as butt weld, as more clearly explained in the following.

A side view of the completed weld is shown in Figure 12. As is seen, there will be a weak point Z of the weld when subjected to bending or flexural stress near the inner end of the depression or indentation 34. At this point, a greater weld strength is obtained by the reduced tool penetration. At other points of the indentation 34, penetration will be greater, to insure more adequate welding and to provide a more efficient electrical contact joint or connection between the cable and the lug. According to a modification, the tip 31 of the tool 17 may be shaped symmetrically; i. e., with outer portions of relatively reduced height at both its opposite ends to obtain increased mechanical strength at both ends of the rectangular weld area, in a manner readily understood.

While there has been shown and described an example where the lug or plate is connected with the end of a wire, it is understood that the wire may extend on either side of the lug, or that a continuous wire may be welded at different and spaced points to a number of plates or strips, to either produce multiple electric connections or for subsequent cutting or severing of individual wire sections or lugs in mass production operations.

In the same manner, a grill-like or similar structure comprising intersecting wires and metal strips may be fabricated, the individual weld connections or joints at the intersecting points being effected either successively by a single welding tool or simultaneously by means of a suitably constructed multiple pressure tool or die assembly, as is readily understood.

In cases where the end of the wire or conductor is welded to the lug or plate, such as in cable-lug joints, the wire 10 may either project on both sides of the welding tip 27 of the tool 17, as shown in Figure 9, or the end of the wire may stop short of the edge of the tool tip by a certain distance r, as shown at z in Figure 12. In the former case, trimming and finishing of the end of the wire after welding will be necessary, while in the latter case, besides eliminating the trimming and finishing of the wire ends, especially in the case of stranded wires, a superior kind of weld will be obtained, combining both the features of a lap weld between the wire and the lug as well as a butt weld between the edges of the wire or individual strands at the point z, Figure 12, and the lug or plate 13.

This additional butt weld effect is due to the fact that, upon bringing down the tool 17 upon the superposed lug and wire, Figure 11, the portion of the tip 27 projecting beyond the edge z of the wire, i. e., in the case shown the portion 32 of greater height of the tip 27, will cause part of the metal of the lug 13 to flow inwardly, i. e., towards the edge z of the wire or strands, thus resulting in a butt weld between the edge of the wire or strands with the lug, in addition to the main weld between the adjoining portions of the lug and wire, as described hereinabove.

A method as described in the foregoing involving both a lap and butt weld effect will enable a reduction of the length of the weld, thus resulting in a shorter lug of improved appearance. At the same time, a more efficient electrical connection between the wire and the lug is obtained. As will be understood, the additional butt weld effect may be realized either with a tool of varying height or depth of penetration at the weld, as shown in Figure 12, or by using a flat-faced tool tip 27 as shown in Figure 9.

While, in the case of aluminum, a percentage reduction of the material at the weld of from 50% to 70% of the total work thickness has been found to produce satisfactory welds in practice, the lower value insuring maximum mechanical strength and the higher value insuring more efficient and intimate welding joint or bonding between the members, such as for electrical connections or the like, a greater reduction than 70% may be employed in special cases where mechanical strength is of lesser importance or provided by other means, such as by additional clamping of the wire by the gripping ears, Figure 1, or varying tool penetration over the welding area, as shown in Figure 12. Thus, in the latter, the reduction by the portion 32 of the tip 27 may be 70% or higher, say about 80% to 85%, to insure a more intimate and efficient electrical joint of reduced transition resistance, while the reduction by the portion 31 may be chosen at any value above 50%, to provide the desired mechanical strength, in the manner pointed out.

The increased depth or tool penetration beyond 70% will be of further advantage in mass production, where there is a possibility of contamination of the surface areas during the welding operations so that a number of the welds may be unsatisfactory, thus increasing the number of rejects. Due to the increased pressure or tool penetration, the effect of the surface contamination will be minimized, thus resulting in greater uniformity and closer tolerances in the mass production of welds of this type. In some cases, the increased tool penetration beyond the 70% limit may make it possible to dispense with any pre-cleaning, in that the increased tool pressure will cause a cracking or destruction of the oxide film, thereby to enable an intimate merging or bonding into a solid phase cold-weld joint.

Referring to Figures 13 and 14, there is shown still another tool assembly of the type according to Figures 10 and 11 for welding a rod or wire 10, preferably of uniform or solid cross section, to a metal plate 10. In this case, only a fractional segmental portion of the wire is held or located in a relatively shallow groove 37 in the anvil or tool 18, the upper tool 17 and welding tip 27 being substantially similar to the tool shown in Figures 10 and 11. As a result, the wire will be flattened during the initial pressure application, whereby to enable the metal to flow laterally as shown at 40, Figures 15 and 16, and to result in a spreading of the weld from the inside out and increase of the effective welding area. This in turn will produce a weld or joint of increased strength.

According to a modification as shown in Figure 17, groove 37 of Figures 13 and 14 may be omitted and the wire located during welding by other suitable means. The joint obtained in this case will be similar to that according to Figures 15 and 16, the actual weld thickness at the indentation 38, being again from 50% to 70% of the total of the plate thickness and wire diameter, as explained in detail hereinabove.

As will be understood, varying depth of tool penetration along the pressure area, as described and shown in Figures 10 to 12, may be employed in connection with members to be welded differing from those shown in the drawings. Thus, in the case of an ordinary lap joint of a pair of simple plates or metal strips, a reduced depth at the ends of the oblong rectangular area will result in a strengthening of the inherently weaker mechanical joint at these points, thus resulting in a more uniform bonding of the members over the entire welding area.

In the foregoing, the invention has been described with reference to specific illustrative devices and methods. It will be evident, however, numerous variations and modifications of both the tool arrangements and steps described, as well as the substitution of equivalent elements and steps differing from those disclosed herein for illustration, may be made without departing from the broader scope and spirit of the invention as set forth in the appended claims. The specification and drawings are accordingly to be regarded in an illustrative rather than in a limiting sense.

I claim:

1. A method of joining a pair of wire and plate members both consisting of cold pressure weldable material comprising providing the members to be joined with uncontaminated metallic surfaces, supporting substantially the outer half of said wire against deformation while allowing the metal of the unsupported wire portion to cold flow freely under the effect of welding pressure applied to said wire, superimposing said plate upon the unsupported half of said wire with the uncontaminated surfaces thereof in contacting engagement, and applying to a localized area of said plate a pressure in a direction substantially at right angle to said plate, to effect an indentation extending through the superposed plate and into said wire and to distort the surrounding metal at the interface to change the same from an initial substantially linear configuration into a lateral extended area and to thus create an intensive interfacial metal flow at said area conducive to welding said wire to said plate by a solid phase welding bond.

2. A method of joining a pair of wire and plate members both consisting of cold pressure weldable material comprising providing the members to be joined with uncontaminated metallic surfaces, supporting substantially the outer half of said wire against deformation while allowing the metal of the unsupported wire portion to cold flow freely under the effect of welding pressure applied to said wire, superimposing said plate upon the unsupported half of said wire with the uncontaminated surfaces thereof in contacting engagement, and applying to a localized oblong rectangular area of said plate being in line with said wire and having a width of the order of the diameter thereof a pressure in a direction substantially at right angle to said plate, to effect an indentation extending through the superposed plate and into said wire and to distort the surrounding metal at the interface to change the same from an initial substantially linear configuration into a lateral extended area and to thus create an intensive interfacial metal flow at said area conducive to welding said wire to said plate by a solid phase welding bond.

3. A method of joining a pair of wire and plate members both consisting of cold pressure weldable material comprising providing the members to be joined with uncontaminated metallic surfaces, supporting substantially the outer half of said wire against deformation while allowing the metal of the unsupported wire portion to cold flow freely under the effect of welding pressure applied to said wire, superimposing said plate upon the unsupported half of said wire with the uncontaminated surfaces thereof in contacting engagement, and applying to a localized oblong rectangular area of said plate being in line with said wire and having a width of the order of the diameter thereof a pressure in a direction substantially at right angle to said plate, to effect an indentation extending through the superposed plate and into said wire and increasing in depth from a minimum at the inner short end of said area to a maximum at the outer end thereof adjacent to the end of said wire, thereby to distort the surrounding metal at the interface to change the same from an initial substantially linear configuration into a lateral extended area and to thus create an intensive interfacial metal flow at said area conducive to welding said wire to said plate by a solid phase welding bond.

4. A method of joining a stranded wire to a terminal lug both consisting of cold pressure weldable metal comprising providing uncontaminated strands of the end portion of said wire and an uncontaminated metallic area of said lug, supporting substantially the outer half of said wire against deformation while allowing the metal of the unsupported wire portion to cold flow freely under the effect of welding pressure applied to said wire, superimposing said lug upon the unsupported half of said wire with the uncontaminated surfaces thereof in contacting engagement, and applying to a localized area of said lug a pressure in a direction substantially at right angle to said lug, to effect an indentation extending through the superposed lug and into said wire and to distort the surrounding metal at the interface to change the same from an initial substantially linear configuration into a lateral extended area and to thus create an intensive interfacial metal flow at said area and among the strands of said wire conducive to welding said wire to said lug and said strands to each other by a solid phase welding bond.

References Cited in the file of this patent

UNITED STATES PATENTS

| Number | Name | Date |
|---|---|---|
| 2,275,163 | Thomas | Mar. 3, 1942 |
| 2,522,408 | Sowter | Sept. 12, 1950 |
| 2,560,678 | Wirt | July 11, 1951 |
| 2,600,012 | Macy | June 10, 1952 |